UNITED STATES PATENT OFFICE.

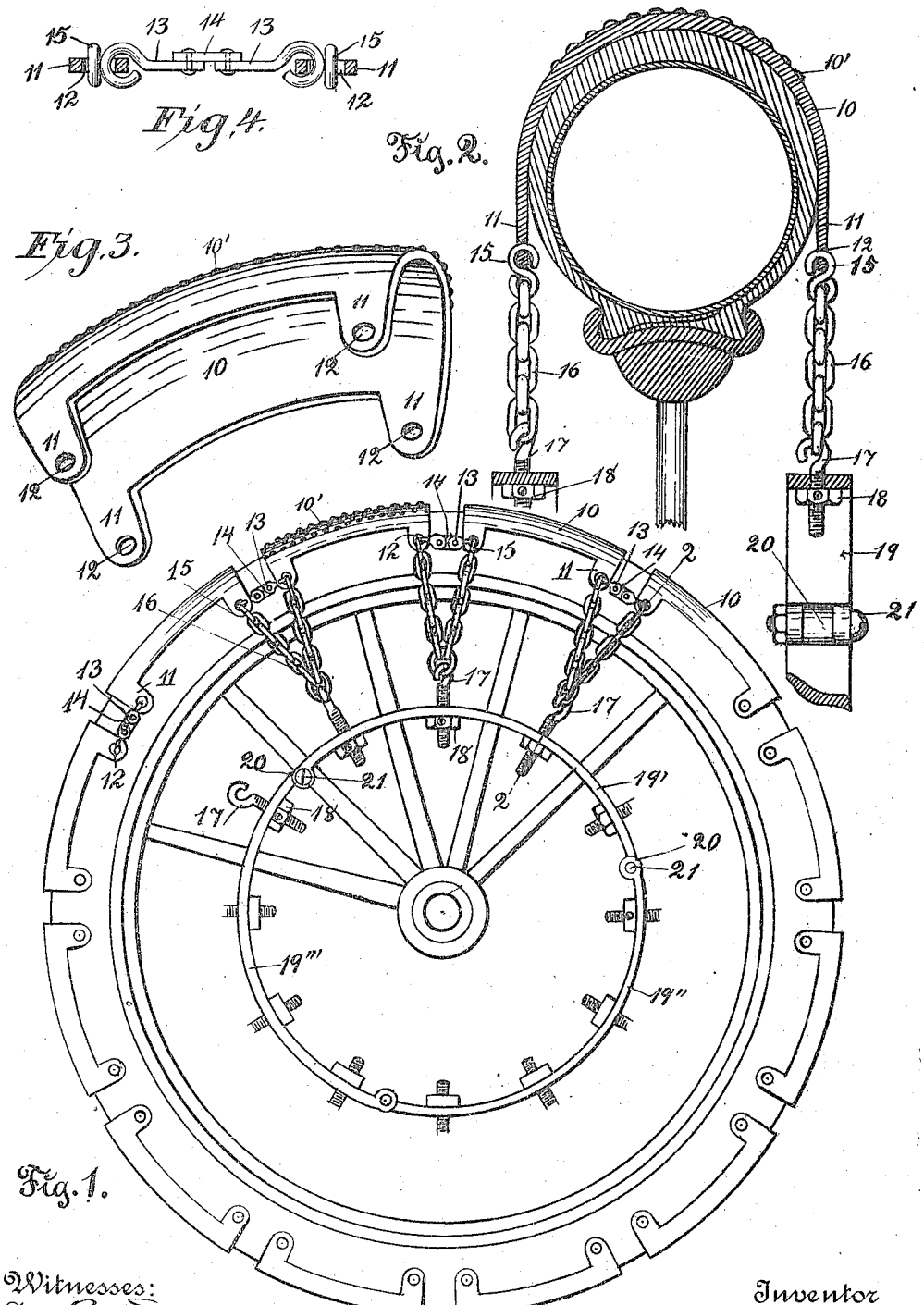

LORENZO CIAFFONE, OF NEW YORK, N. Y.

NON-SKIDABLE TIRE GUARD.

1,221,511.     Specification of Letters Patent.     Patented Apr. 3, 1917.

Application filed January 11, 1912. Serial No. 670,574.

*To all whom it may concern:*

Be it known that I, LORENZO CIAFFONE, a subject of the King of Italy, residing in the city of New York, county of New York, and State of New York, have invented certain new and useful Improvements in Non-Skidable Tire Guards, of which the following is a specification.

This invention relates to improvements in vehicle wheel tire guards and particularly to that class used in connection with either pneumatic or rubber cushion tires as adapted to be used on the higher class of vehicles.

Its objects are, to provide means effectually preventing punctures in such tires and the consequent bursting thereof, to minimize the wear of the same and which will prevent side-slip or skidding; moreover its object is to prevent a tire from coming off the wheel of a vehicle by accidental displacement and yet in no manner to interfere with the proper resilient action of such tires; and finally, to provide such guards so constructed that sections thereof may be removed or replaced without disturbing the remaining sections, thereby greatly facilitating its application.

These and other objects, which will become more fully apparent, are attained by the novel arrangement and construction of parts hereinafter fully described and shown in the accompanying drawings, forming parts of this specification, and in which:

Figure 1 is a side view of a wheel having my guard applied.

Fig. 2 is a partial sectional view, taken on line 2—2 of Fig. 1.

Fig. 3 is a perspective view of the guard in detail and Fig. 4 is a detailed view showing more particularly how the hooked links are engaged with the holes in the extensions of the tread plates.

As much of the expense attendant upon operating vehicles using tires of the character described is caused by the rapid wear and deterioration of the outer or contacting surface, causing frequent renewal of the same; many protective devices have been proposed; some of these have also been arranged with the view of avoiding skidding or side slipping, as the result of such action is not only highly destructive to the tires but uses the energy of the motive power uselessly and is productive of many accidents resulting in damage to the vehicle and those using it.

In order to overcome these troubles, and at the same time fully preserve the resilience of the tire, I have devised a guard comprised of a series of segmental plates 10 shaped to agree with the tire profile in cross section and having on the outer surface raised projections 10' which may be of any preferred size or shape to suit the conditions of use; each of the plates are provided with ears or extensions 11, at both ends, on each side near their inner edges; these extensions have holes 12 formed in them adapted to receive hooked links 13 pivotally connected by the members 14 in such manner that each plate is maintained at a definate distance from the adjacent plate, but yieldingly, so that each plate is free to adjust itself to the tire and inequalities of the road bed or surface conditions; these links prevent longitudinal displacement, one plate with respect to another, and also creeping around the surface of the tire.

In these holes 12 are also inserted hooks 15 to which are attached short chains or other equivalent flexible connecting means 16 those belonging to adjacent plates being brought together at their inner ends and engaged by an eye-bolt 17, the same being screw-threaded and provided with a nut 18 for adjusting the tension of the chains, and through them secure the plates 10 tightly upon the surface of the tire.

In order to maintain a uniform degree of tension all around the tire, the shanks of the eye-bolts 17 pass through rings 19 disposed at each side of the wheel and unconfined except for these bolts and their nuts which are adapted to impinge against the inside of the rings in such manner that when any one of the nuts is tightened the effect is uniformly transmitted to all of the bolts, thereby maintaining all of the chains or connections equally taut.

To permit of the disassociation of any particular plate readily and conveniently, the ring or band 19 is preferably made in sections 19', 19'', and 19''', each section being united by a hinge joint 20 so constructed that upon the withdrawal of a single bolt member 21 the joint may be opened freely and without interference with the other sections of the ring except that the stress is incidentally relieved on the remaining engaged bolts.

From the foregoing it may be seen that this device can be readily applied to any ordinary form of rubber tired vehicle wheel without involving any changes in it or previous preparation whatever; that it avoids the weighty and cumbersome appearance of devices used for similar purposes and has the feature of automatic adjustability so pronounced that a novice can successfully mount and put it in operation.

Having thus described my invention, what I claim as new and desire to secure by Letters Patent, is:

In combination with a tire, a guard therefor comprising a plurality of tread plates shaped to conform to the transverse configuration of said tire and disposed upon the periphery thereof, links flexibly connecting the tread plates together, a floating retaining device, adjustable means carried by said retaining device, and connecting devices arranged in pairs between said adjustable means and the tread plates, the connecting devices of each pair being attached at one end to a common point on the adjustable means while the other ends of said connecting devices are attached to the tread plates at common points with the links.

In testimony whereof, I have signed my name to this specification in the presence of two subscribing witnesses.

LORENZO CIAFFONE.

Witnesses:
JOSEPH POMPINO,
EUGENE TURRO.